United States Patent [19]
Wheeler

[11] Patent Number: 5,181,301
[45] Date of Patent: Jan. 26, 1993

[54] METHOD OF MAKING A VERY COMPACT AUDIO WARNING SYSTEM

[76] Inventor: Basil W. Wheeler, Rte. 9, Box 209, Athens, Ala. 35611

[21] Appl. No.: 762,798

[22] Filed: Sep. 20, 1991

Related U.S. Application Data

[63] Continuation of Ser. No. 446,126, Dec. 5, 1989, abandoned, which is a continuation-in-part of Ser. No. 142,915, Jan. 12, 1988, Pat. No. 4,884,523, which is a continuation-in-part of Ser. No. 837,011, Mar. 6, 1986, Pat. No. 4,178,372.

[51] Int. Cl.$^5$ .............................................. B29D 17/00
[52] U.S. Cl. ........................................ 29/169.5; 116/3; 181/141; 181/152; 181/155; 181/159; 181/191; 181/194
[58] Field of Search .............. 29/169.5; 116/3, 4, 116/137 R; 181/141, 152, 155, 159, 191, 194; 340/384 E

[56] References Cited

U.S. PATENT DOCUMENTS

| | | | |
|---|---|---|---|
| 1,134,360 | 4/1915 | Walker | 340/474 |
| 1,625,325 | 4/1927 | McCartney et al. | 181/194 |
| 1,813,208 | 7/1931 | Smythe | 181/194 |
| 2,058,555 | 10/1936 | Betts et al. | 181/194 |
| 2,194,070 | 3/1940 | Giannini | 181/159 |
| 2,558,278 | 6/1951 | Stone et al. | 181/194 |
| 4,689,609 | 8/1987 | Ko et al. | 181/143 |

FOREIGN PATENT DOCUMENTS 2156638 10/1985 United Kingdom ............... 181/194

*Primary Examiner*—P. W. Echols
*Attorney, Agent, or Firm*—John C. Garvin, Jr.

[57] ABSTRACT

A vehicle warning system (1) is disclosed. The device includes a main housing (2) to which is attached a sound generator (7), a lighting system (4), a mounting bracket (4) which is used to attach the device to an emergency vehicle, and a trim ring (6) which conceals the structure for mounting the device. As a sound signal is produced by the generator (7) it passes through a nozzle (9) and an aperture (14) into a deflector means (3) which is designed to expand and direct the sound signal through carefully proportioned chambers (30) and (33) of the deflector (3) so as to direct the sound signal against the closed portion (15) of expander horn (16) and out the open portion of the expander horn (16). In operation the sound generating system is attached to an amplifier of well known design and is capable of producing a variety of sound signals.

5 Claims, 7 Drawing Sheets

METHOD OF MAKING A VERY COMPACT AUDIO WARNING SYSTEM

CROSS REFERENCE TO RELATED APPLICATION

This application is a continuation application of U.S. patent application Ser. No. 07/446,126 filed Dec. 5, 1989, now abandoned, which is a continuation-in-part of U.S. patent application Ser. No. 07/142,915 filed Jan. 12, 1988 now U.S. Pat. No. 4,884,523 dated Dec. 5, 1989, which was a continuation-in-part of prior U.S. patent application, Ser. No. 06/837,011, filed Mar. 6, 1986, now U.S. Pat. No. 4,718,372, dated Jan. 12, 1988.

TECHNICAL FIELD

The present invention relates to an audio warning system and more particularly to an audio warning system which is exceptionally compact and may be adapted to be attached in the grill or bumper area of an emergency vehicle.

BACKGROUND OF THE INVENTION

As is well known, conventional emergency vehicles include noise making and lighting systems intended to warn persons in the area of their approach. Typically such emergency vehicles have sirens and lighting systems mounted on the top, the hood or the fenders. Heretofore mounting of warning systems in such locations on the vehicle has been necessitated by the size and configuration of available warning systems. However such locations produce many undesirable effects. For example, a typical siren mounted on top the vehicle, its hood or fenders produces a great deal of noise within the vehicle. If mounted on the hood of conventional type vehicles, engine heat greatly diminishes the longevity of the device. Further it has been shown by extensive testing that the higher the device is located from the ground plane, the less effective is its ability to transmit the generated sound over a satisfactory distance so as to warn of the approach of the vehicle. Heretofore vehicle warning systems were not designed to be mounted in a location which is suitable for increasing the sound level ahead of the vehicle while at the same time decreasing the level within the vehicle. Some prior art systems utilized a large megaphone type horn to direct the sound signal. This type device permits the signal to be expanded and directed as it passes through the lengthy horn portion of the magaphone. The present invention provides the necessary direction and expansion of a noise signal over the appropriate distance by use of a system only a fraction of the length of a typical megaphone type system. Thus by virtue of the present system's unique design, the length of travel of the sound signals within the device is sufficient to allow complete expansion and direction of the signal and yet provide a system which is compact enough to be mounted in the grill or lower forward portion of an emergency vehicle. Further, existing devices do not contemplate the dual function of a sound and lighting system which may be mounted in the grill or lower forward portion of an emergency vehicle and which does not inhibit vital vehicle functions such as its cooling. The deficiencies in existing systems are pointed out by the fact that recent government specifications have been published to define a satisfactory warning system. These specifications require a high level sound carrying capability on the outside of the vehicle and at the same time require a decrease in the noise level within the vehicle.

Therefore it is an object of this invention to provide an emergency vehicle warning system which overcomes the shortcomings of existing warning systems.

It is a further object of this invention to provide a vehicle warning system which, while being very compact, permits the appropriate travel of sound signals over the required distance and direction so as to achieve maximum signal output.

Another object of this invention is to provide a warning system which may be quickly and easily mounted in the grill or bumper area of modern vehicles without affecting vital operations of the vehicle.

Yet another object of this invention is to provide a warning system which includes both sound and visual warning means in a compact device.

Still another object of this invention is to provide a compact audio visual warning system which may be mounted in the front of a vehicle by conventional means and which requires no extensive modifications for its mounting.

It is another object of this invention to provide a system which is attractive and which includes a trim ring which totally conceals all mounting portions of the system and is easily and quickly mountable and removeable.

A further object of this invention is to provide a system which is suitable for mounting on the lower forward portion of an emergency vehicle whereby it may direct sound signals in close proximity to ground level at a very high level and which produces a minimum of noise within the vehicle itself.

It is another object of this invention to provide a device which, while compact, is designed to cause the generated sound signals to move within the system a sufficient and calculated distance whereby the expansion and direction of the signals are carefully controlled to achieve maximum efficiency and the highest possible audio levels.

SUMMARY OF THE INVENTION

The present invention is a vehicle warning system which is specifically designed to be located in the confines of the grill area of a modern vehicle wherein space is very limited. In such a location the device may be positioned in close proximity to the ground thus utilizing the reflection of sound signals as they strike the ground forward of the vehicle to enhance the effectiveness of the signal. Thus the device as presented is capable of meeting or exceeding modern sound level requirements for warning systems, by use of a unique system for directing and expanding the noise signal, while occupying only a small portion of the area needed to mount existing warning systems.

The device also encompasses a lighting portion which operates in conjunction with the sound generation portion of the device.

DETAILED DESCRIPTION OF THE INVENTION

Figure 1:
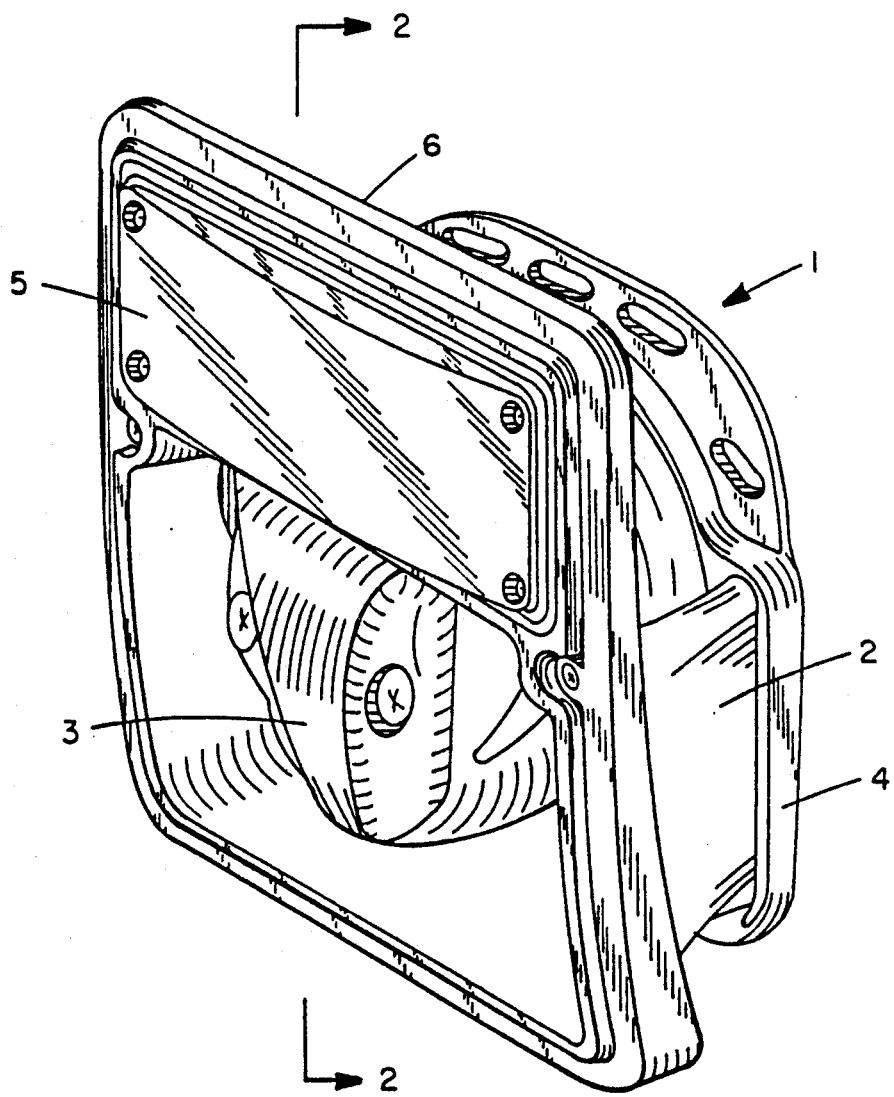
FIG. 1 is a perspective view of the present invention showing its general configuration.

FIG. 1 discloses a vehicle warning system 1 which in general includes a main housing 2, a noise deflector 3, a mounting base 4, a light 5, and a trim ring 6.

As is best illustrated in FIG. 1 the main housing 2 is formed to receive three principal elements, a sound generator 7, a light assembly 5 and a deflector 3. The sound generator and light are specifically shown in FIG. 1 to be in vertical side-by-side relation. The sound generator 7 (FIG. 2) comprises a driver portion 8 and a nozzle portion 9, from which the sound signal from driver portion 8 is emitted. The driver receives electrical signals through input leads 10 which are connected to a conventional amplifier and control head and which supply the electrical signals. The driver in turn converts the electrical signals to sound signals. These signals may take numerous forms such as a public address transmission, the sound of a siren, a yelp, an airhorn, a wail, or a two tone signal such as is common in European emergency vehicles. Thus the driver is in effect a high efficiency speaker which generates a variety of sound signals as needed for emergency vehicle application. It will also be noted from FIGS. 1, 2 and 3a that the main housing 2 comprises an upper portion 26 which serves as a receptacle for light 5. This light consists of a lens 28, and a bulb and socket arrangement 11. The light is connected by wires 12 to conventional switching or strobe control means to operate the light in the manner desired. It is further noted in FIGS. 2 and 3a that sound generator 7 is supported in a semi-circular receptacle 27 provided in the housing and that the nozzle 9 of the sound generator 7 is located within nozzle receiver 13 which also includes at its forward portion an aperture 14 through which the generator sound signals must pass. The deflector 3 (FIGS. 2 and 3a) is attached to a forward surface 15 of housing 2 and includes a rearwardly extending portion which serves as a secondary expansion chamber 33 which opens into the rear of the expander horn 16. Deflector 33 is sealed along the upper closed end of the expander horn by seal 17. The upper closed end serves as the inlet 31, for deflector 33. The primary expander horn 16 is rectangular in shape and the nozzle receiver aperture 14 is located adjacent the upper long side 18 of the primary expander horn 16. This long side of the primary expander horn 16 also makes up the lower portion of the rectangular shaped light receptacle 26 which receives the light 5. This receptacle 26 is an integral part of the main housing 2.

The expander horn 16 is formed in the front side of the main housing 2 as an integral part of the main housing. The expander horn 16 has a closed rear portion 24 and an open front portion 28. A first receptacle 27 for the driver portion 8 of the sound generator 7 is formed in the rear side of the main housing 2 as an integral part of the main housing. The first receptacle 27 and the expander horn 16 have a common wall 29 provided with a vertical portion 37 and a horizontal portion 38, so that the first receptacle 27 for the sound generator 7 forms a first projection 36 in the top portion of the expander horn. Wall 29 further includes a lower portion 39 which forms the lower enclosure of the expansion horn 16.

Figure 2:
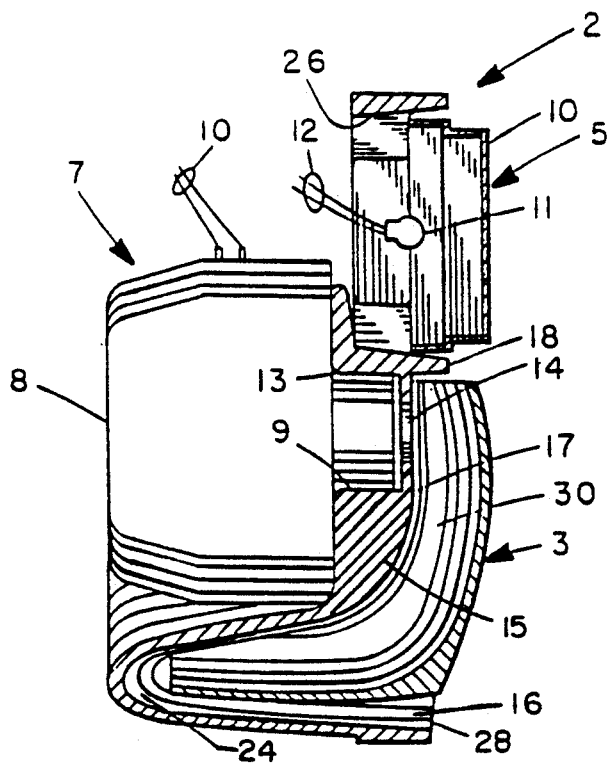
FIG. 2 is a partial sectional view taken along 2—2 of FIG. 1.
Figure 3:
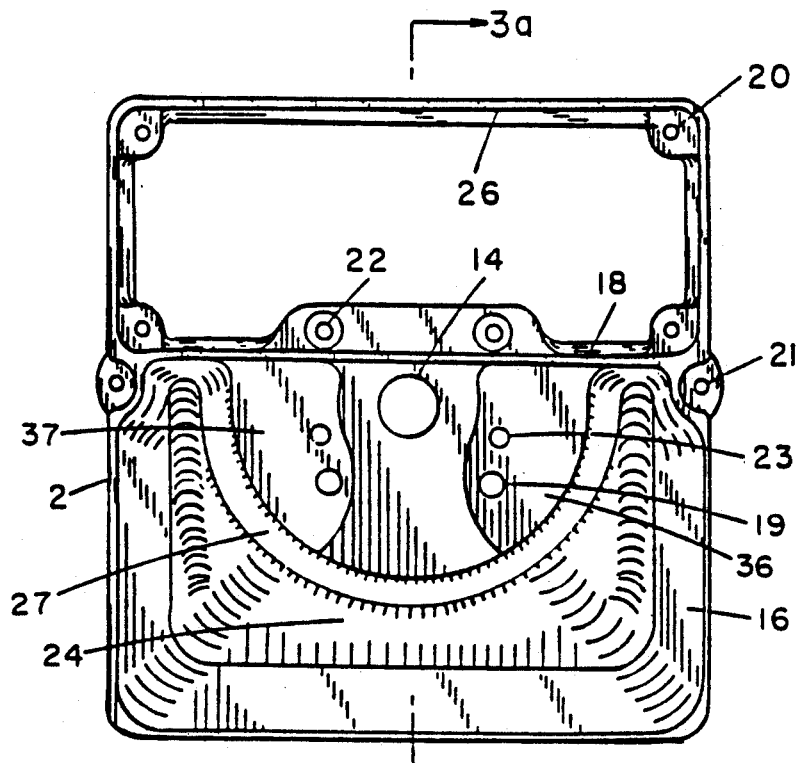
FIG. 3 is a front view of the main housing of the invention with all other elements removed for illustration of the details of construction of the housing.
Figure 3A:
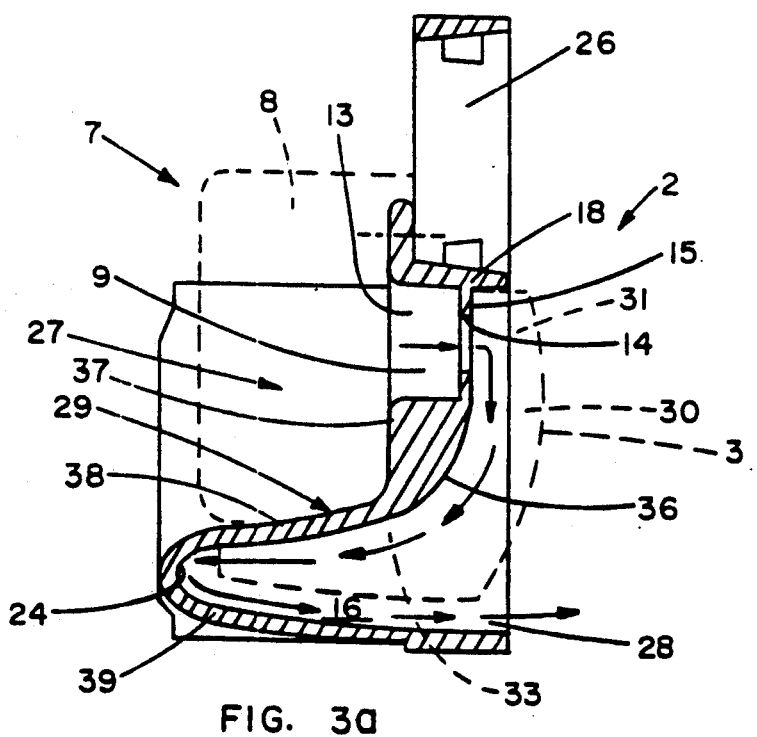
FIG. 3a is a sectional taken along line 3a—3a of the housing shown in FIG. 3 and, for illustrative purposes only, shows the sound generator and deflector in dot-dash lines.

As may also be seen in FIGS. 2 and 3a, the sound generator 7 comprises an outlet nozzle 9 attached to the forward end of the driver portion 8 of the sound generator 7. The main housing 2 also comprises a second, smaller receptacle 13 for enclosing the outlet nozzle 9 of the sound generator 7 in the forward end of the first receptacle 27. The second receptacle 13 is formed in vertical portion of common wall 29 of the main housing 2 as an integral part of the main housing 2.

FIG. 3, which shows a front view of the main housing 2 with the deflector 3 and light 5 removed, best illustrates the arrangement of the various means for attaching these components to the housing. The deflector 3 for example, is held in place by screws which are adapted to pass through the holes 19 for engagement in tapped holes formed in the forward portion of sound generator 7. The holes 20 are threaded and are adapted for reception of screws for retaining the light mechanism in the light receptacle 26. Holes 21 are threaded to receive screws for retaining the trim ring 6. The sound generator 7 is held in place by screws which pass through holes 22 and into threaded holes within the sound generator and by screws which pass through the deflector 3 and holes 19 of the main housing 2 and are threaded into the sound generator 7.

Figure 4:
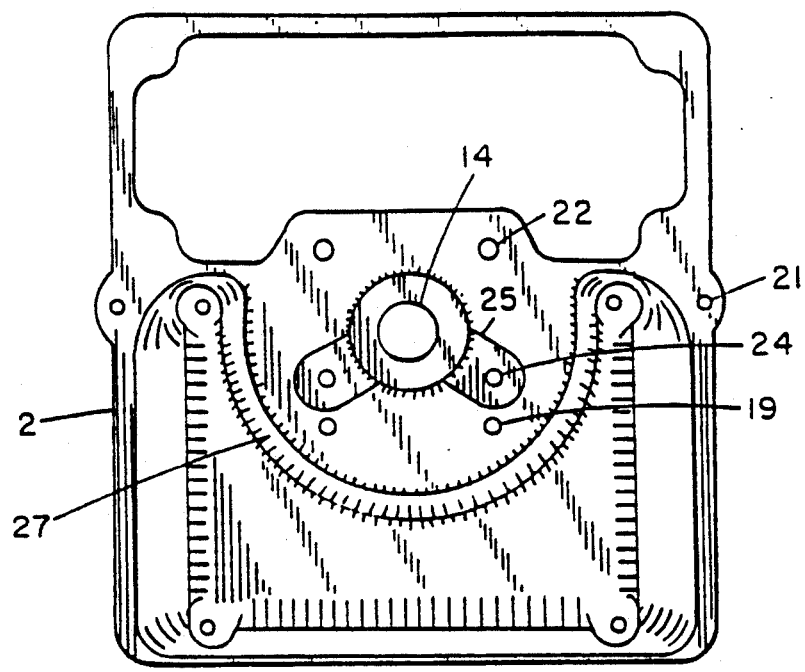
FIG. 4 is a rear view of the main housing of the device with all other elements removed for illustration of the details of construction of the housing.

FIG. 4 is a rear view of housing 2 with all parts removed, showing the configuration of the housing and the relative location of the mounting holes as illustrated in FIG. 2 except for the threaded holes 20 which do not pass completely through housing 2. Also illustrated on either side of aperture 14 are relieved and flattened portions 25 which provide a suitable mounting surface for the sound generator 7. The lower portion of the rear side of main housing 2 has a semicircular indentation forming receptacle 27 which is closed on its bottom side and open on its upper side. This indentation 27 in the rear side of main housing 2 encloses the lower half of the driver portion 8 of sound generator 7, so that main housing 2 and sound generator 7 fit together to make a compact package.

Figure 5:
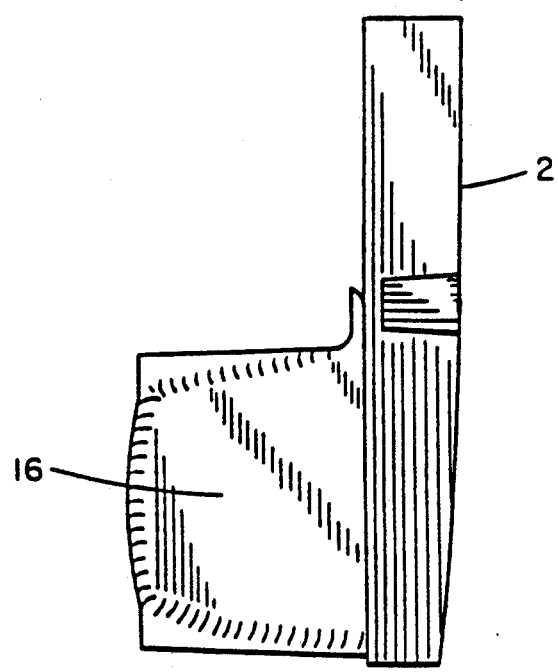
FIG. 5 is a side view of the main housing of the invention with all other elements removed for illustration of the details of construction of the housing.

FIG. 5 is a side view of the housing 2 which illustrates the configuration of the main housing 2 and in particular the configuration and depth of the primary expander horn 16.

While the sectional view of FIG. 2 also illustrates in general the configuration of the main housing 2 and the deflector 3, FIGS. 6 through 9 show in greater detail the intricacies of the deflector 3, which are a critical part of this invention.

Figure 6:
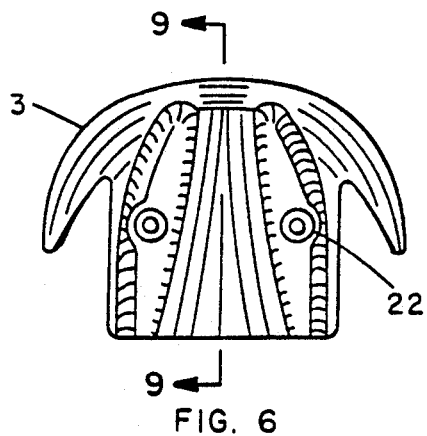
FIG. 6 is a front view of the deflector, a part of the invention.

FIG. 6 shows the general configuration of the deflector 3 as viewed from the front and shows mounting holes 22 which pass completely through the deflector 3 to receive screws for attaching the deflector 3 to the main housing 2 and the sound generator 7.

Figure 7:
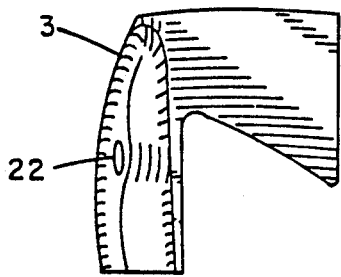
FIG. 7 is a side view of the deflector.

FIG. 7 shows the general configuration of the deflector 3 when viewed from the side.

Figure 8:
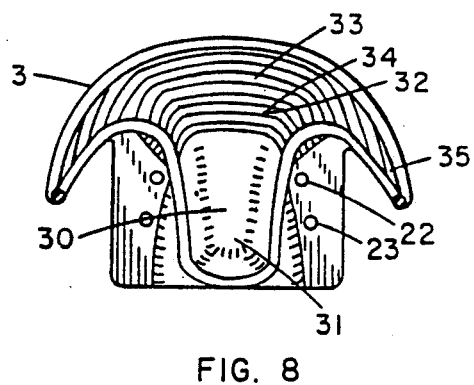
FIG. 8 is a rear view of the deflector.

FIG. 8 shows the configuration of the deflector 3 as viewed from the rear and shows through holes 22 and threaded blind holes 23 which receive deflector mounting bolts.

Figure 9:
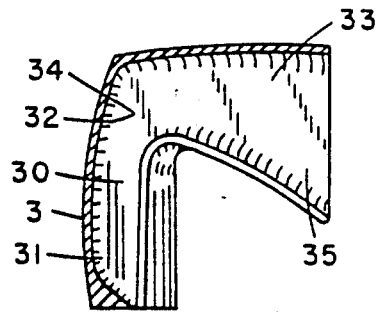
FIG. 9 is a sectional view of the deflector taken substantially along line 9—9 of FIG. 6.

FIG. 9 shows a cross section of the deflector 3, and FIGS. 8 and 9 also show the critical dimensional relationships which permit the efficient expansion of the sound signal from sound generator 7. These relationships are required to achieve maximum sound levels.

Use of this carefully designed deflector permits the sound signal to travel a considerable distance while being expanded at the proper rate thereby producing the highest possible sound levels from this very compact device, the outside length of which is a fraction of the length of the systems presently used. This deflector configuration is the result of a great deal of design, calculation, experimentation and testing.

FIG. 8 illustrates the relationships between the widths of the deflector chambers while FIG. 9 shows the relationships between the depths and lengths of said chambers. These relationships produce a well defined volume change within the expander chambers. As illustrated in FIG. 8 an initial expander chamber 30 has an inlet portion 31 and an outlet portion 32. It will be noted that the width of the inlet 31 is approximately ½ the width of the outlet 32. The deflector has a secondary expansion chamber 33 illustrated in FIGS. 8 and 9. This expansion chamber 33 also has an inlet portion 34 and an outlet portion 35. It will be noted that the inlet portion 34 of the secondary expansion chamber 33 and the outlet portion 32 of the initial expansion chamber 30 are one and the same. However, they have been identified separately for clarity.

Other dimensional relationships producing the outstanding results now possible in the unique design of this invention are as follows: The width of the common outlet and inlet portions 32 and 34 of the two expansion chambers 30 and 33 is approximately ⅓ the width of the outlet portion 35 of the secondary expansion chamber 33. The length (see FIG. 9) of each of the chambers 30 and 33 is approximately double the width (see FIG. 8) of the common outlet and inlet portions 32 and 34 and is also approximately ½ the width (see FIG. 8) of the outlet portion 35 of the secondary expansion chamber 33. Referring in particular to FIG. 9, the depth relationships became more obvious. It may be seen that the depth of portion 31 of the initial expansion chamber 30 is approximately equal to the depth of the outlet portion 32. Thus, the depth of the outlet and inlet portion 32, 34 of the expansion chambers 30 and 33 is approximately ½ of the depth (measured vertically in FIG. 9) of the outlet portion 35 of the secondary expansion chamber 33.

Figure 10:
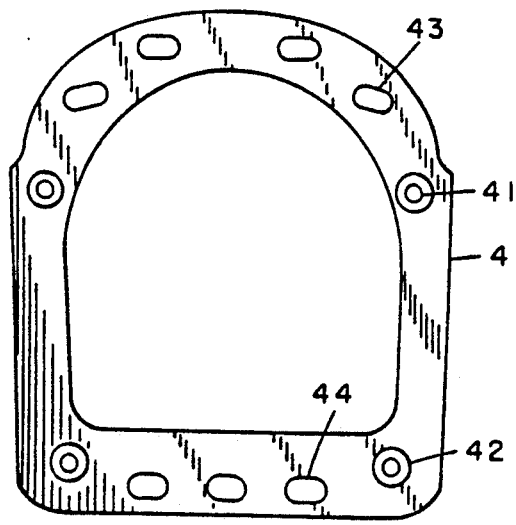
FIG. 10 is a front view of the mounting base of the present invention.
Figure 11:
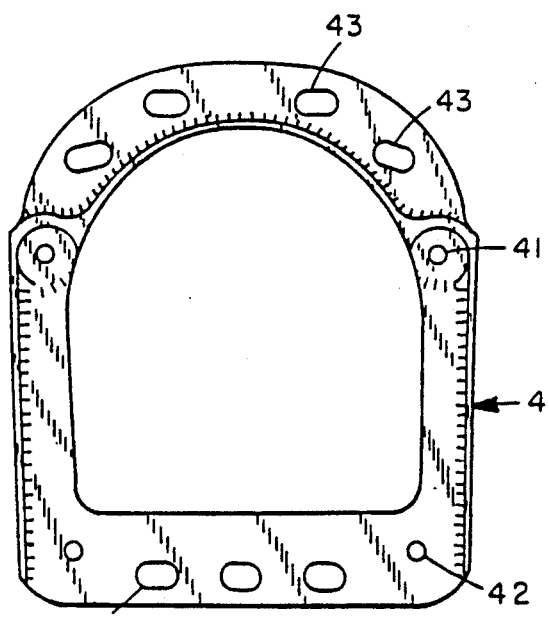
FIG. 11 is a rear view of the mounting base.

Referring now to FIGS. 10 and 11 the mounting base 4 is illustrated in a frontal view in FIG. 10 and in a rear view in FIG. 11. In FIG. 10 it will be noted that the holes 41 and 42 are designed for attachment of the mounting base to the main housing 2 of the device whereas the holes 43 and 44 are designed for mounting the system to a vehicle and are shaped in an oval configuration to allow for minor adjustments in the location of the device.

Figure 12:
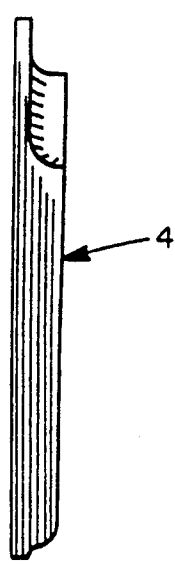
FIG. 12 is a side view of the mounting base.

The depth and configuration of the base 4 are best illustrated in FIG. 12.

Figure 14:
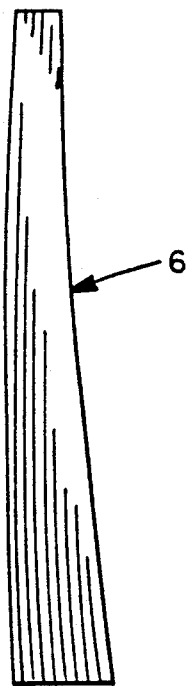
FIG. 14 is a side view of the trim ring.
Figure 13:
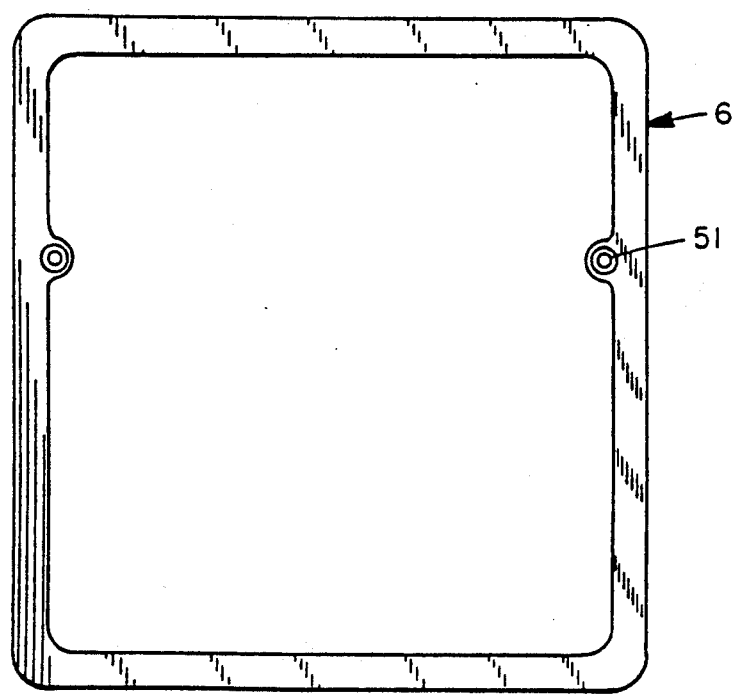
FIG. 13 is a front view of the trim ring of the present invention.
Figure 15:
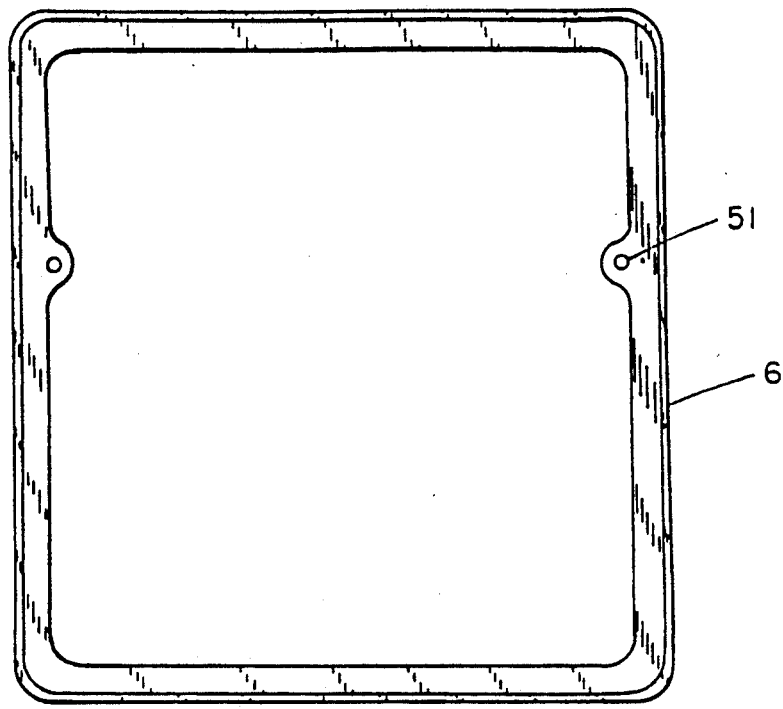
FIG. 15 is a rear view of the trim ring.

FIGS. 13, 14 and 15 show the details of trim ring 6 which surrounds the main housing 2 for concealment of the mounting base and its associated hardware. The trim ring is attached by means of conventional bolts passing through holes 51 which are located slightly above the midpoint on the vertical sides of the trim ring 6.

Figure 16:
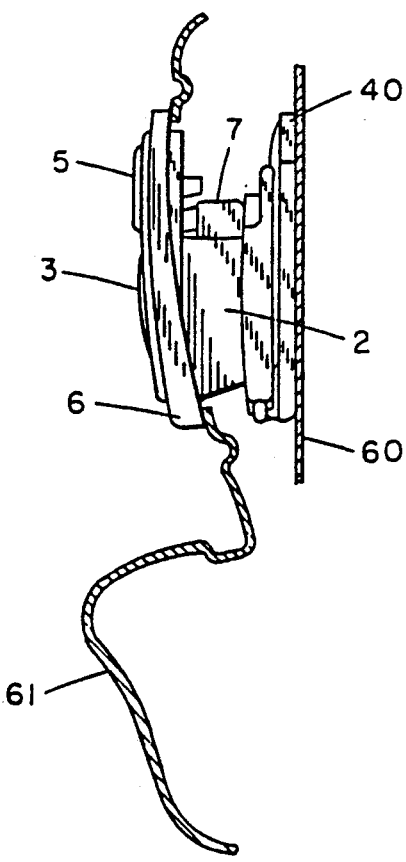
FIG. 16 is a partial sectional view of the present invention as mounted in the forward portion of a vehicle.

FIG. 16 shows the warning system mounted in the grill portion 61 of an emergency vehicle. As illustrated in this view, main housing 2 is attached to a support member 60 of the vehicle by the mounting base 4. Also illustrated is the application of trim ring 6 which serves to conceal the cut portions of the grill 61 as well as the mounting base 4 and its related hardware.

From the above disclosure, it may be seen that applicant has provided an audio warning system eminently suitable for use as a warning horn or siren for an ambulance or other emergency vehicle. The invention has an exceptionally compact arrangement which provides two 90° changes of direction in the sound path, followed by a 180° change of direction in the expander horn. In fact, the invention is less than 5 inches deep, from front to back. Thus, it works exceptionally well and performs better than prior art devices which are much larger and which could not be mounted down low on the front of an emergency vehicle and recessed into its front grill. This allows the high performance which can be achieved when the siren or horn can be mounted close to the ground plane. In performance tests by the applicant, he has determined that, in spite of its compact arrangement, which has not previously been known in the ambulance siren art, his audio warning system performs at a sound level only slightly less than available large, long horns, which are not compact enough to be mounted in the grill of an emergency vehicle.

Although this invention has been described herein as a vehicle warning system, it should be understood that the system may also be used as a stationary siren warning system, such as an air raid siren, disaster warning system, volunteer fire fighters system, or factory whistle.

I claim:

1. A method of making a very compact voiceless vehicular warning system including a light and a sound generator disposed for emitting voiceless warning sound waves to the atmosphere, said sound generator having an outlet, a sound deflector means, and an expander horn for expanding and propagating sound waves generated by said sound generator, said method comprising the steps of:

forming a housing with a cavity defining said expander horn, said expander horn having side enclosures, a closed rear enclosure and an open front portion;

forming said housing with a wall having an upper vertical portion provided with an opening therein, an intermediate horizontal portion, and a lower portion, said upper vertical portion and said intermediate portion forming a semi-circular receptacle for support of said sound generator, and, said intermediate portion and said lower portion forming a said side enclosure and said rear enclosure for said expander horn;

mounting said sound generator in said semi-circular receptacle for aligned relation of said sound generator outlet with said opening;

attaching said sound deflector to said vertical portion of said wall, said sound deflector disposed for receiving the sound waves from said sound generator outlet and for deflecting said sound waves through a first angle of sustantially 90° and then through a second angle of substantially 90° for subsequent propagation of the sound waves substantially 180° from the path formed by the second deflection of the voiceless warning sound waves, whereby said propagated sound waves serve as a voiceless audio warning signal;

forming a receptacle in side-by-side relation with said expander horn and mounting said light in said receptacle; and attaching said voiceless audio warning system to a vehicle whereby a vehicular warning system is produced.

2. The method of claim 1 wherein the step of propagating said voiceless warning sound waves out of said housing includes the step of deflecting said voiceless warning sound waves substantially 180° from the path formed by the second deflection of the voiceless sound waves.

3. The method of claim 2 including the step of attaching said housing to the lower forward portion of the vehicle whereby said voiceless sound warning waves are transmitted forwardly of said vehicle and in proximity of the ground surface.

4. The method of claim 3 wherein said lower forward portion of said vehicle is defined as the area of the grill of the vehicle.

5. The method of claim 4 wherein said vehicular warning system includes trim means and the method of making said compact vehicular warning system includes the step of attaching said housing in said forward portion of said vehicle with said trim means disposed around the periphery of said housing.

* * * * *